(12) United States Patent
Schlack

(10) Patent No.: US 9,624,967 B2
(45) Date of Patent: Apr. 18, 2017

(54) DEVICE FOR POSITIONING AN OBJECT AT A USER-ADJUSTED POSITION

(71) Applicant: Southco, Inc., Concordville, PA (US)

(72) Inventor: Richard E. Schlack, Rising Sun, MD (US)

(73) Assignee: SOUTHCO, INC., Concordville, PA (US)

( * ) Notice: Subject to any disclaimer, the term of this patent is extended or adjusted under 35 U.S.C. 154(b) by 0 days.

(21) Appl. No.: 14/717,084

(22) Filed: May 20, 2015

(65) Prior Publication Data

US 2015/0345543 A1    Dec. 3, 2015

Related U.S. Application Data

(60) Provisional application No. 62/003,749, filed on May 28, 2014.

(51) Int. Cl.
| | |
|---|---|
| F16M 11/00 | (2006.01) |
| F16C 11/04 | (2006.01) |
| F16M 11/04 | (2006.01) |
| F16M 11/38 | (2006.01) |
| F16M 13/02 | (2006.01) |

(52) U.S. Cl.
CPC ........... *F16C 11/04* (2013.01); *F16M 11/046* (2013.01); *F16M 11/38* (2013.01); *F16M 13/02* (2013.01); *F16M 2200/047* (2013.01); *F16M 2200/08* (2013.01); *Y10T 403/32016* (2015.01)

(58) Field of Classification Search
USPC ....... 248/564, 567, 581, 584, 585, 587, 588, 248/590, 591, 123.11, 125.2, 919
See application file for complete search history.

(56) References Cited

U.S. PATENT DOCUMENTS

| | | | | |
|---|---|---|---|---|
| 3,741,512 A | * | 6/1973 | Olsson ...................... | B65G 1/07 108/136 |
| 4,764,075 A | * | 8/1988 | Cox ......................... | B65G 1/07 108/136 |
| 4,926,760 A | * | 5/1990 | Sack ...................... | B66F 7/0666 108/145 |

(Continued)

FOREIGN PATENT DOCUMENTS

CN    203176680    9/2013

OTHER PUBLICATIONS

GB Search Report dated Nov. 20, 2015 for GB Application No. 1509066.5.

*Primary Examiner* — Bradley Duckworth
(74) *Attorney, Agent, or Firm* — RatnerPrestia

(57) ABSTRACT

A device is provided for positioning an object with respect to another object. The device includes a linkage having an extended condition and a collapsed condition, the linkage including at least one pair of links coupled to one another about a pivot rotation axis. The device also includes a friction element positioned at the pivot rotation axis of the at least one pair of links of the linkage. A spring of the device is positioned to apply bias to the links of the at least one pair of links of the linkage. The device is configured to resist unintended movement of the object from the user-adjusted position along the path and to facilitate intended movement of the object proximally toward or distally away from the other object.

26 Claims, 14 Drawing Sheets

(56) References Cited

U.S. PATENT DOCUMENTS

| | | | | |
|---|---|---|---|---|
| 5,794,911 A * | 8/1998 | Hill | B60N 2/502 | |
| | | | 248/419 | |
| 5,927,679 A * | 7/1999 | Hill | B60N 2/502 | |
| | | | 248/421 | |
| 6,997,422 B2 * | 2/2006 | Sweere | F16M 11/04 | |
| | | | 248/123.11 | |
| 7,383,923 B2 * | 6/2008 | Patten | B66F 7/065 | |
| | | | 108/105 | |
| 7,694,920 B2 * | 4/2010 | Lien | F16M 11/04 | |
| | | | 248/125.1 | |
| 7,784,747 B2 * | 8/2010 | Gan | F16M 11/04 | |
| | | | 248/123.11 | |
| 7,789,354 B2 * | 9/2010 | Gan | F16M 11/04 | |
| | | | 248/121 | |
| 7,793,897 B2 * | 9/2010 | Wang | F16M 11/10 | |
| | | | 248/121 | |
| 7,854,417 B2 * | 12/2010 | Gan | F16M 11/24 | |
| | | | 248/122.1 | |
| 8,016,252 B2 * | 9/2011 | Su | F16M 11/00 | |
| | | | 248/125.8 | |
| 8,074,948 B2 * | 12/2011 | Zou | F16M 11/04 | |
| | | | 248/123.11 | |
| 2008/0237414 A1 * | 10/2008 | Lien | F16M 11/04 | |
| | | | 248/125.2 | |
| 2010/0176254 A1 * | 7/2010 | Sweere | A47B 21/0073 | |
| | | | 248/123.11 | |
| 2012/0119040 A1 | 5/2012 | Ergun | | |
| 2013/0256489 A1 | 10/2013 | Ergun | | |

\* cited by examiner

US 9,624,967 B2

DEVICE FOR POSITIONING AN OBJECT AT A USER-ADJUSTED POSITION

CROSS REFERENCE TO RELATED APPLICATION

This application claims the benefit of U.S. Provisional Application No. 62/003,749, filed May 28, 2014, the contents of all of which are incorporated herein by reference in their entirety.

BACKGROUND OF THE INVENTION

Devices have been proposed in the past for positioning an object at a user-adjusted position. Some such devices have a relatively low cycle life and may fall prematurely. Other devices may require adjustment by the user in order to be configured for use with objects of different weights. Still other devices require a lever or brake mechanism in order to secure an object in a user-adjusted position.

Although one or more of these characteristics may be acceptable or even desirable in some circumstances, there remains a need for improved devices for positioning an object at a user-adjusted position that can optionally eliminate one or more of these characteristics. There also remains a need for a device improved in terms of at least one of performance, cost-effectiveness, reliability, and durability.

SUMMARY OF THE INVENTION

According to one aspect, this inventions provides a device for positioning an object with respect to another object. The device includes a linkage having an extended condition and a collapsed condition, the linkage including at least one pair of links coupled to one another about a rotation axis. The device also includes a friction element positioned at the rotation axis of the at least one pair of links of the linkage. A spring of the device is positioned to apply bias to the links of the at least one pair of links of the linkage. The device is configured to resist unintended movement of the object from the user-adjusted position along the path and to facilitate intended movement of the object proximally toward or distally away from the other object.

The device can be configured such that the object is movable by a user along the path to the user-adjusted position and the object remains in the user-adjusted position after it is released by the user, and the linkage can be configured to generate a force sufficient to at least partially counterbalance the weight of one of the objects. The linkage is optionally configured to reduce variations in the force over the range of motion of the linkage between the extended condition and the collapsed condition.

According to another aspect, this invention also provides a user-adjustable positioning system. The system includes a first object movable by a user of the system and a second object with respect to which the first object is movable along a path proximally toward or distally away from the second object. The system also includes a linkage having a distal end portion coupled to the first object and a proximal end portion coupled to the second object, the linkage also having an extended condition and a collapsed condition. The linkage includes at least one pair of links coupled to one another about a rotation axis, and a friction element is positioned at the rotation axis of the at least one pair of links of the linkage. A spring is positioned to apply bias to the links of the at least one pair of links of the linkage. The linkage is configured to resist unintended movement of the first object from the user-adjusted position along the path and to facilitate intended movement of the first object proximally toward or distally away from the second object.

The distal end portion of the linkage of user-adjustable positioning system is optionally moveable along the path and the proximal end portion of the linkage is optionally stationary or moveable. The first object optionally includes a monitor and the second object optionally includes a desk top or cart top. The path can be oriented vertically, and the linkage can be configured such that the ratio of the force required to move the first object to the weight of the first object is less than one. The friction generated by the friction element is preferably sufficient to prevent movement of the linkage from the extended position to the collapsed position when the bias of the linkage toward the extended condition generated by the spring is less than the weight of the first object, and the friction generated by the friction element is preferably sufficient to prevent movement of the linkage from the collapsed position to the extended position when the bias of the linkage toward the extended condition generated by the spring is greater than the weight of the first object.

BRIEF DESCRIPTION OF THE DRAWINGS

FIG. 8A is a perspective view of the scissors mechanism illustrated in FIG. 7 in an extended condition, FIG. 8B is a side view of the scissors mechanism, FIG. 8C is a bottom view of the scissors mechanism, FIG. 8D is a bottom view of the scissors mechanism with lower links removed, FIG. 8E is a top view of the scissors mechanism, and FIG. 8F is a top view of the scissors mechanism with upper links removed.

FIG. 9A is a perspective view of the scissors mechanism illustrated in FIG. 7 in a collapsed condition, FIG. 9B is a side view of the scissors mechanism, FIG. 9C is a bottom view of the scissors mechanism, FIG. 9D is a bottom view of the scissors mechanism with lower links removed, FIG. 9E is a top view of the scissors mechanism, and FIG. 9F is a top view of the scissors mechanism with upper links removed.

DETAILED DESCRIPTION OF THE INVENTION

Figure 1A:
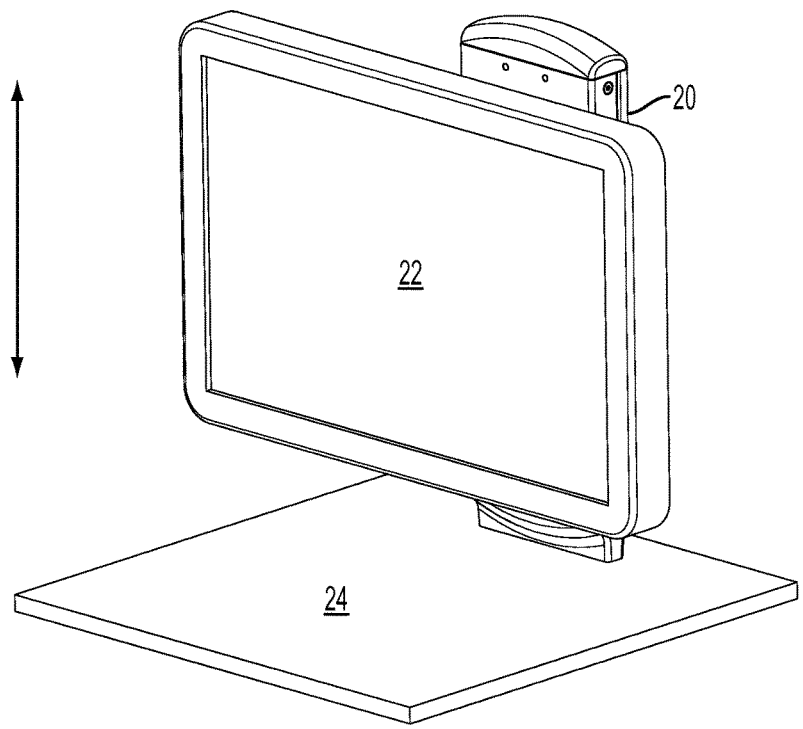
FIGS. 1A and 1B are perspective views of an example of a system, according to one aspect of this invention, that includes an embodiment of a device for positioning an object at a user-adjusted position along a path with respect to another object.

Although the invention is illustrated and described herein with reference to specific embodiments, the invention is not intended to be limited to the details shown. Rather, various modifications may be made in the details within the scope and range of equivalents of the claims and without departing from the invention.

According to one aspect, this invention provides a vertical lift mechanism that can be used to position a moveable object at a user adjusted position with respect to a stationary base, and can allow the moveable object to remain at that position until the user re-adjusts the moveable object. The mechanism also provides a counterbalancing effect so that the user force input to position the moveable object is less than the weight of the moveable object itself. This user force input is nearly constant over the range of motion of the mechanism.

One specific application for this mechanism is to vertically position a monitor with respect to a desktop or cart top. As will be described later, many other applications and orientations of the mechanism are contemplated within the scope of this invention.

According to exemplary aspects, this invention provides a nearly constant counterbalancing force over the range of motion of the mechanism, friction in the mechanism so that a brake is not required, a mechanism configured to work with a specified range of moveable object weights, and a mechanism that can be fit into a reasonably sized physical package.

According to embodiments of the invention, a scissors mechanism is biased into an extended orientation by torsion springs, and also uses friction elements to add friction to the mechanism. One end of the scissors is attached to the stationary base, and the other end is attached to the moveable object. The torsion springs are located at outer pivot axes of the scissors links, and friction elements are positioned at center pivot axes. In the extended orientation, the resultant force from the torsion springs is applied in a nearly horizontal direction. Due to the geometry of the scissors, a small horizontal resultant force can counterbalance a much larger vertical force. As the scissors mechanism is collapsed, the torsion springs are wound up and the force they output increases. At the same time, the direction of the spring resultant force changes from nearly horizontal to nearly vertical. Due to the geometry of the scissors, as the mechanism is collapsed, the resultant counterbalancing force from the torsion springs becomes closer to a 1:1 ratio with the weight of the movable object.

The friction elements at the center scissors rotation axes add friction to the mechanism. This friction is applied to allow the mechanism to be used for a range of moveable object weights. If the counterbalancing force is less than the moveable object weight, the friction elements will prevent the scissors from collapsing due to the weight of the moveable object. If the counterbalancing force is greater than the moveable object weight, the friction elements will prevent the scissors mechanism from raising the moveable object. The friction elements also provide a braking action, helping to hold the moveable object at its intended position.

The three exemplary elements of these scissors—the links, the torsion springs, and the friction elements, can be combined in many variations to support various moveable object weights and ranges of motion. Smaller moveable object weights for a given range of motion can be accommodated by removing torsion springs, or adjusting the spring rates. Smaller and larger ranges of motion can be accomplished by removing or adding scissors links. A smaller scissors mechanism can, for example, include a pair of short top links and short bottom links with two torsion springs.

The torsion springs can be replaced with extension springs that act between the outer pivot axes of the scissors mechanism, thereby stretching (increasing the force) as the scissors mechanism collapses and contracting (reducing the force) as it extends.

The remaining components of such a vertical lift mechanism can be used to control the motion of the scissors mechanism and provide guidance and support for the moveable object. Upper and lower friction plates can be provided with a long slot that is used to guide the center rotation axes of the scissors mechanism to move in a straight line. In addition, the friction plates provide a smooth low friction surface for the scissors mechanism to slide against. The slide assembly can use commercially available ball slides to guide a bracket to which the moveable object is attached. This provides a low friction means to support the moment of the moveable object, caused by its weight and its distance from the center of the slide assembly.

The moveable end of the scissors mechanism attaches to a bracket. A base cover and top cover provide the attachment to a stationary end of the scissors mechanism. They also surround the scissors mechanism to prevent the user from accessing pinch points in the scissors mechanism. The end cap and base are cosmetic pieces used to close off the open ends of the covers. Washers can be used as part of the scissors assembly; namely, they can provide a positive stop for a peening operation that fixes the top and bottom links to each other and assures the pivot axes are free to rotate. Torque shafts provide a high strength surface for the friction elements to grasp. Pop rivets fix the slide assembly into the base cover and screws can hold the end cap and base to the covers.

While a wide variety of materials can be selected, the preferred materials for the components include aluminum sheet for the base and top covers; die cast zinc for the links, end cap, and base; low carbon steel for the slide assembly and washers; plastic such as acetal for the friction plates;

music wire for the torsion springs; and high carbon steel for the torque shafts and friction elements.

While some mechanisms optionally use constant force springs to provide a counterbalancing function, the design of constant force springs requires a large diameter spring in order to achieve a significant number of cycles (one cycle is an extension and contraction of the spring) for a given load. For moveable objects weighing up to 8 kg, for example, a constant force spring must be approximately 75 mm in diameter to achieve a cycle life of 25000 cycles. This results in a large physical size of the mechanism, or a reduction of the desirable product parameters (less counterbalancing force or fewer cycles) to achieve a reasonable physical package size. Accordingly, the use of constant force springs is not preferred according to this invention, and embodiments of this invention make it possible to eliminate such constant force springs.

While other mechanisms optionally use a lever or braking device to hold a moveable object at its adjusted position, this may create an ergonomic difficulty for the user, who must simultaneously hold the brake device in a released position while moving the moveable object to the desired position. The brake is then reset to hold the moveable object in place. This approach also increases manufacturing cost and complexity. Accordingly, the use of such a braking device is not preferred according to this invention, and embodiments of this invention make it possible to eliminate such braking devices.

Also, an adjustment capability is optionally used so that the user can match a counterbalancing force to the weight of a particular moveable object they are moving. While this may be a desirable feature (to provide a specific user operating farce), it does add cost to the mechanism and requires an intervention by the manufacturer or user to be properly adjusted. Accordingly, the use of such an adjustment capability is not preferred according to this invention, and embodiments of this invention make it possible to eliminate such adjustment capability.

Referring generally to the Figures, one aspect of the present invention provides a device (20) for positioning an object (22), such as a monitor for example, at a user-adjusted position along a path with respect to another object (24). The device (20) is configured to resist unintended movement of the object (22) from the user-adjusted position along the path and to facilitate intended movement of the object (22) proximally toward or distally away from the other object (24). The device includes a linkage (38), a friction element (68), and a spring (65).

The linkage (38) has an extended condition in which the object (22) can be positioned distally away from the other object (24) and a collapsed condition in which the object (22) can be positioned proximally toward the other object (24). A distal end of the linkage (38) is configured to be coupled to the object (22) and a proximal end of the linkage (38) is configured to be coupled to the other object (24), such as a desk top or cart top for example.

The distal end of the linkage (38) is moveable along the path and the proximal end of the linkage (38) is stationary or moveable. The device (20) and/or the path may be oriented vertically and the object (22) is movable vertically with respect to the other object (24) along the path. The linkage (38) includes at least one pair of links (e.g., links 64a, 66a) coupled to one another for rotation with respect to one another about a rotation axis that is positioned along the path. The linkage (38) may also include two or more pairs of links (e.g., links 64/66a and 64/66b), each link being coupled to an adjacent link for rotation about a rotation axis, and the link may further include a shaft (63b) connecting the link of one pair of links to the link of an adjacent pair of links.

The friction element (68) is positioned at the rotation axis of the at least one pair of links of the linkage (38), and the friction element (68) generates friction that resists rotation of the links with respect to one another about the rotation axis. The friction element (68) is configured to brake movement of the object (22) along the path such that a separate brake need not be included in the device (20).

One or more springs (65), such as a torsion spring oriented along the rotation axis for example, are positioned to apply bias to the links of the at least one pair of links of the linkage (38), and are oriented to bias the linkage toward the extended condition. In another embodiment of the invention, as mentioned previously, the spring is an extension spring configured to generate increased force as the linkage moves toward the collapsed condition and reduced force as the linkage moves toward the extended condition.

The direction of the path of the movable object need not be vertical, but can instead be oriented horizontally or at any angle with respect to horizontal. Independent of the direction of the path, one or more springs such as torsion springs are therefore optionally oriented such that the resultant force generated by the springs is parallel to the direction of the path when the linkage is in the collapsed condition and/or is not parallel to the direction of the path when the linkage is in the extended condition. The direction varies as the linkage moves between the collapsed condition and the extended position.

The friction generated by the friction element (68) is sufficient to prevent movement of the linkage (38) from the extended position to the collapsed position and/or the reverse direction (i.e., from the collapsed position to the extended position), when the bias of the linkage (38) toward the extended condition generated by the springs (65) is less than the weight of the object. The counterbalancing effect of the device (20) overall is such that a ratio of the force required to move the object (22) to the weight of the object (22) is less than one. This ratio may also be constant or nearly constant along the path traveled by the object (22), i.e., the force required to move the object is approximately the same regardless of the starting point of the object (22) along the path.

The device (20) may also be configured to accommodate objects of varying weights. The friction element, spring, and/or links may be selected such that the device is configured to resist unintended movement of an object (22) within a range of weights. In particular, the friction elements may be configured to maintain the object in the user selected position for objects within a predetermined range of weights.

The device (20) further includes at least one friction plate (36), a slide assembly (33), and a housing. The linkage (38) moves along the at least one friction plate (36) between the extended condition and the collapsed condition. The at least one friction plate (36) defines a slot extending along the path and is configured to limit movement of the rotation axis of the at least one pair of links (64a/66a) away from the path. The slide assembly (33) includes a bracket (34) to which the object (22) and the linkage (38) are coupled and a ball slide to guide the bracket (34) along the path. The housing encloses the linkage (38) and includes a cover (32), a proximal cap (46) at a proximal end of the cover (32), and a distal cap (44) at a distal end of the cover (32).

In another aspect of the invention, a user-adjustable positioning system comprises a first object (22) movable by a user of the system, a second object (24) with respect to which the first object (22) is movable along a path proximally toward or distally away from the second object (24), a linkage (38), and a friction element (68). The linkage (38) is configured to resist unintended movement of the first object (22) from the user-adjusted position along the path and to facilitate intended movement of the first object (22) proximally toward or distally away from the second object (24).

In yet another embodiment of the invention, a device for positioning an object (22) at a user-adjusted position along a path with respect to another object (24) includes means for generating friction that resists movement of the linkage from the extended condition to the collapsed condition, and means for biasing the linkage toward the extended condition.

The friction generating means can include a friction element coupled to the linkage. Other friction generating means include components or materials capable of resisting movement when applied to the linkage. For example, dampeners, torsion washers, or rotating friction discs may be applied to at least one of the pivot axes or rotation axes. Alternatively, a viscous fluid, such as grease, could be applied to the pivot or rotation axes to limit or resist movement. Also, the circumferential shape of the shafts where the pivot and/or rotation axes are located could be formed in such a way as to generate varying friction forces when rotated within a dissimilarly shaped bore or sleeve.

The biasing means can include a spring coupled to the linkage. The biasing means may also include any energy storing device capable of contributing to a counterbalancing force against the weight of an object coupled to the linkage. These may include torsion springs, extension springs, or cams.

Figure 1B:
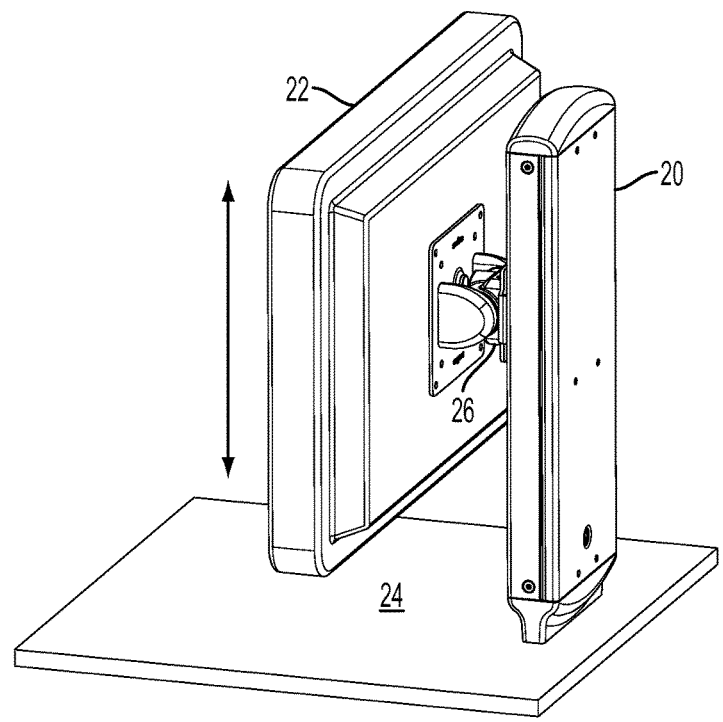

Referring now to each of the figures more specifically, wherein like reference numerals used in the figures denote like parts throughout the various figures, FIGS. 1A and 1B are illustrations of one embodiment of a device according to the present invention in an installed condition as a component of a user-adjustable positioning system. A first object (22), such as a monitor, is attached to a vertical lift mechanism (20). The bottom of the vertical lift mechanism (20) is attached to a second object (24), such as a desk top or movable cart. As indicated by the double-headed vertical arrow, the vertical lift mechanism (20) allows the first object (22) to move in a generally vertical motion along a path relative to the second object (24) while the second object (24) is stationary. As will be described in detail below, the vertical lift mechanism (20) allows the first object (22) to be moved to any location along the vertical path and provides a nearly constant counterbalancing force over the range of motion of the mechanism. The first object (22) will remain at a location selected by the user along the vertical path without requiring a separate locking or braking mechanism.

The vertical lift mechanism (20) may be incorporated into various applications in which a vertically adjustable object is desired, e.g., a monitor, a projection screen, a shelf, a storage rack, a chalkboard, or a work surface. Additionally, the lift mechanism (20) is optionally oriented in horizontal or other non-vertical orientations.

The location and form of the second object (24) is dependent on the application of the vertical lift mechanism (20). For example, in the embodiment illustrated in FIGS. 1A and 1B, the second object (24) is in the form of a base or horizontal surface, while one views and/or accesses the first object (22), which is in the form of a monitor. However, if it is desired to have a wall-mounted monitor, for example, the vertical lift mechanism (20) may be secured directly to a vertical surface, such as a wall, thereby eliminating the need for a base or horizontal surface attached to the vertical lift mechanism (20). The point of reference for the vertical displacement of the first object (22) would then be some other stationary location, such as the floor, a point on the wall, or the ends of the vertical lift mechanism. It is also contemplated that the lift mechanism (20) may be installed at any angle to control the position of a first object along an inclined or declined or horizontal path. The vertical lift mechanism (20) is ideally suited to provide a counterbalancing force to the weight of a first object, so that the first object may remain at a given position at various heights independent of the orientation of the vertical lift mechanism (20).

Figure 2A:
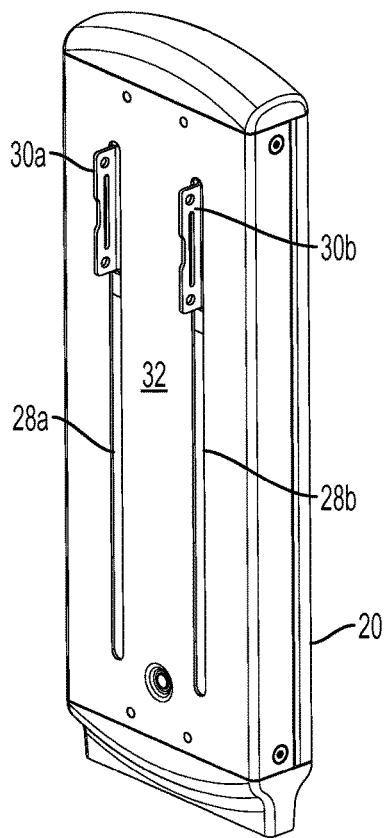
FIGS. 2A and 2B are perspective views of the device of the system shown in FIGS. 1A and 1B, in two different positions.
Figure 2B:
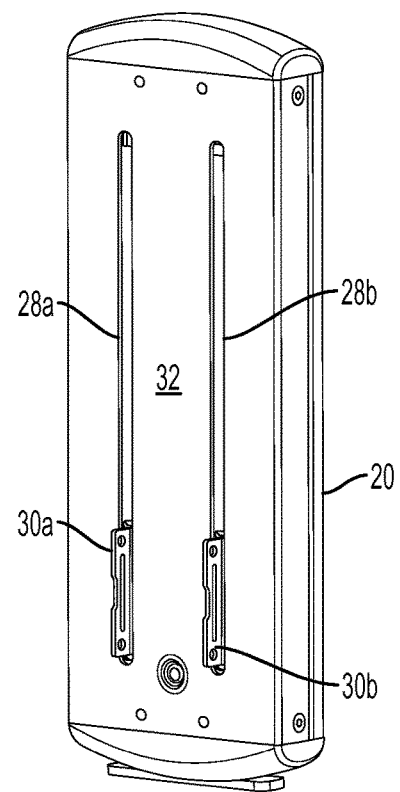

A vertical lift mechanism (20) according to an embodiment of the invention is illustrated in FIGS. 2A to 9F. FIGS. 2A and 2B demonstrate the vertical lift mechanism (20) in the extended and collapsed conditions, respectively. Within the vertical lift mechanism (20) is a bracket which slides vertically. The bracket comprises two arms (30a, 30b). The arms provide a point of attachment between the first object and the vertical lift mechanism (20). Depending on various factors, such as the weight and shape of the first object, the bracket may include one or more arms, such that the first object may be securely attached to the vertical lift mechanism (20). It is preferred, however, that the bracket have at least two arms. Each of the two arms (30a, 30b) extends through a respective elongated opening or slot (28a, 28b) in a front cover (32) of the vertical lift mechanism (20). In FIG. 2A, the arms (30a, 30b) are located at the distal end of elongated openings (28a, 28b), which corresponds to the extended condition in which the first object (22) is relatively more distal from the second object (24). In FIG. 2B, the arms (30a, 30b) are located at the proximal end of the elongated openings (28a, 28b), which corresponds to the collapsed condition in which the first object (22) is relatively more proximal to the second object (24).

Figure 3:
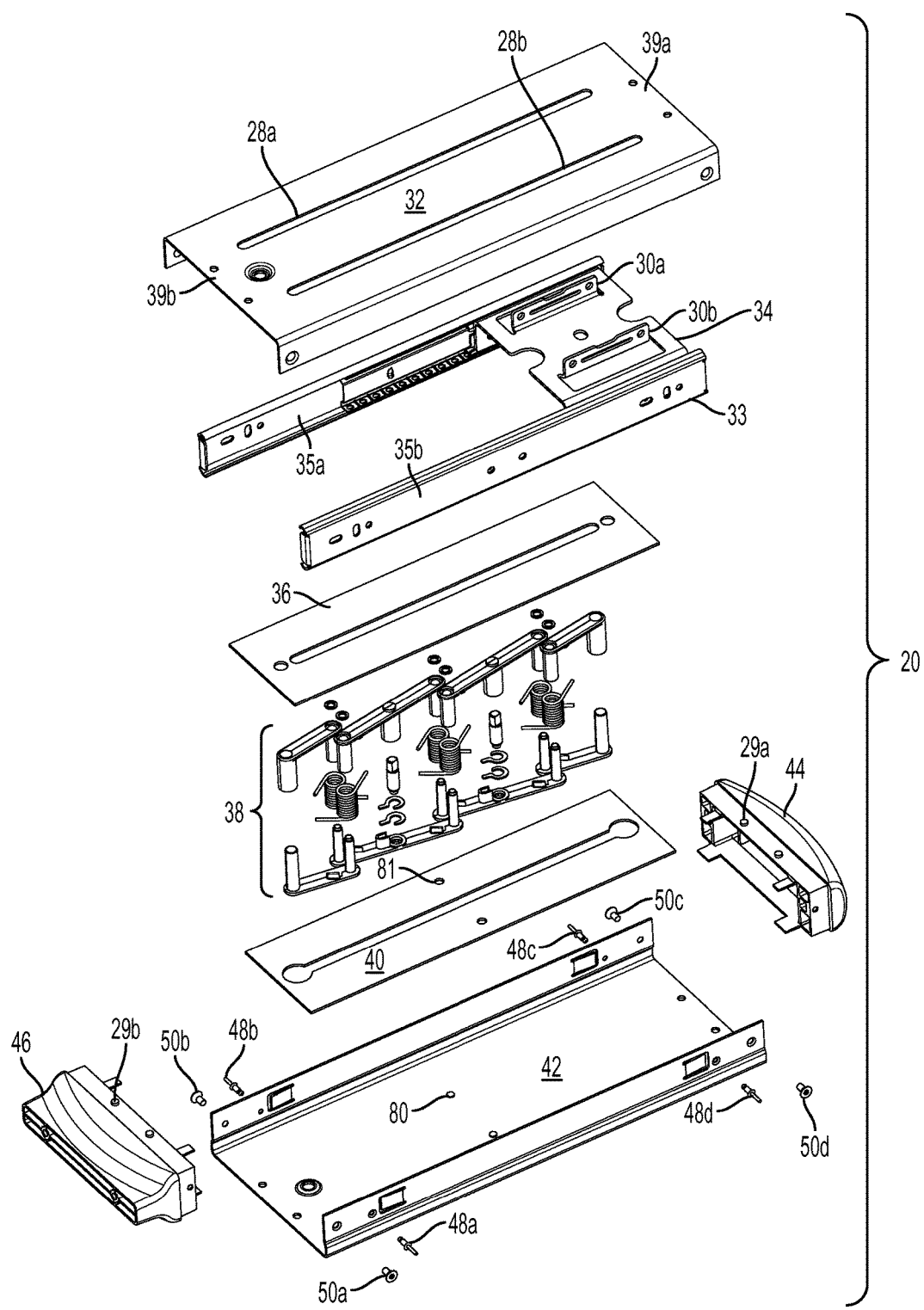
FIG. 3 is an exploded perspective view of the device of FIGS. 2A and 2B.

Referring now to FIG. 3, an exploded view of the vertical lift mechanism (20) is provided. The vertical lift mechanism (20) includes a housing comprising a front cover (32), a rear cover (42), an end cap (44), and a base cap (46), which may be held together using a first set of fasteners (50a, 50b, 50c, 50d), such as threaded studs. To limit the number of fasteners needed to assemble the housing, one or more integral projections (29a, 29b) may be provided on the face of the end cap (44) and/or base cap (46) that mate with a corresponding hole at end portions (39a, 39b) of the front cover (32) and/or rear cover (42). The first set of fasteners (50a, 50b, 50c, 50d) may also be inserted through two or more of the front cover (32), rear cover (42), end cap (44), and base cap (46). The housing shields a user from the internal moving parts of the mechanism and prevents injury to the user during operation or damage to the parts.

Figure 4A:
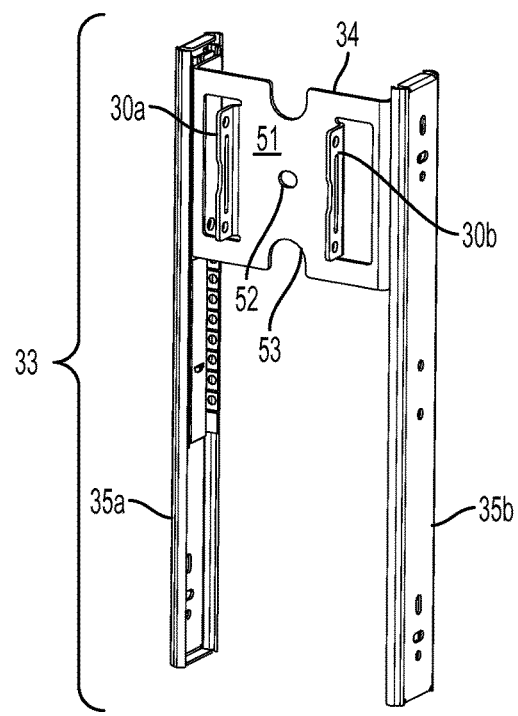
FIGS. 4A and 4B are perspective views of an embodiment of a slide assembly of the device of FIGS. 2A and 2B.
Figure 4B:
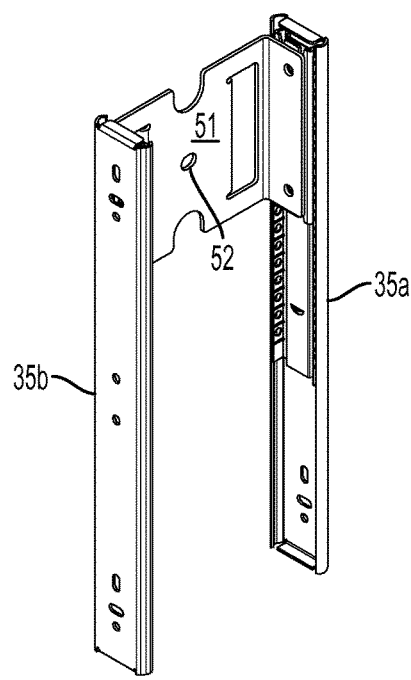
Figure 5A:
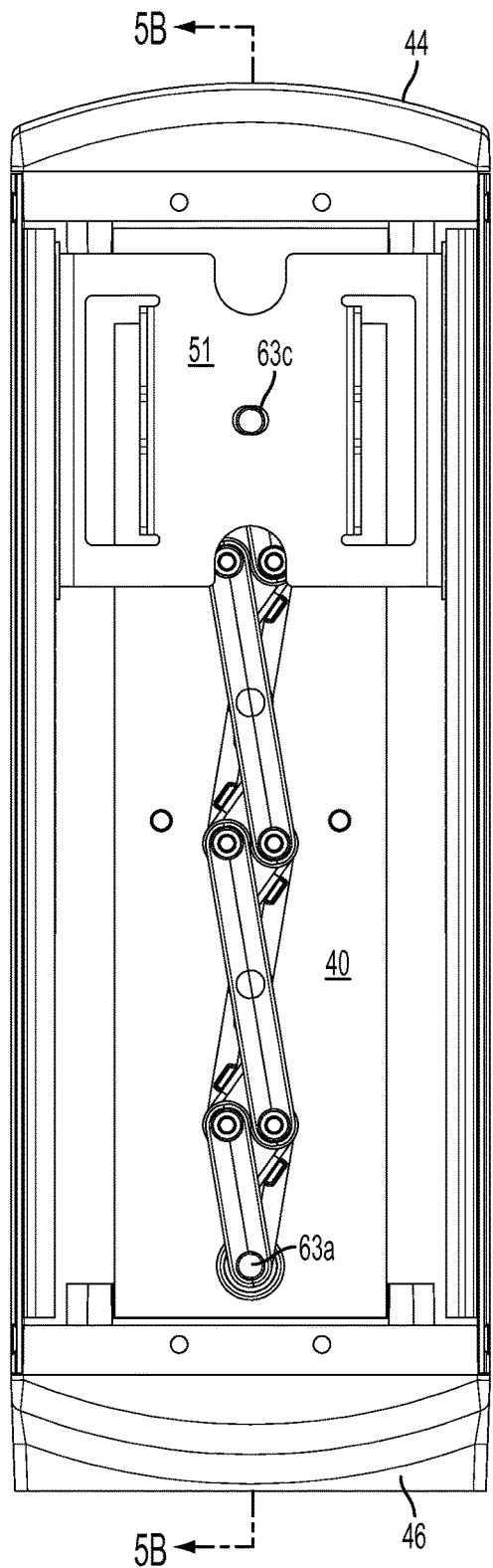
FIG. 5A is a front view of the device of FIGS. 2A and 2B with a front cover removed to reveal an interior of the device.
Figure 5B:
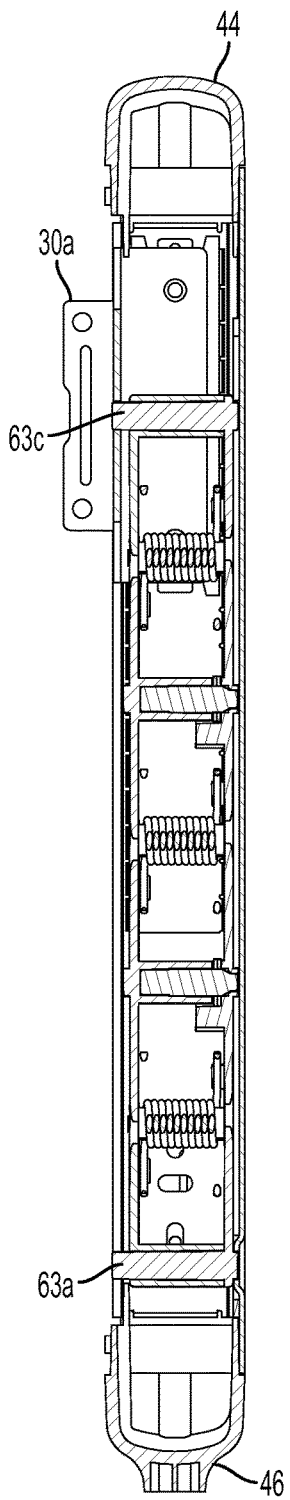
FIG. 5B is a cross-sectional side view of the device of FIGS. 2A and 2B, with a scissors mechanism of the device in an extended condition.

As previously described, the front cover (32) may include two elongated openings or slots (28a, 28b), which receive the arms (30a, 30b) of a bracket (34). The arms (30a, 30b) extend generally perpendicularly from the surface of a slide plate (51) of the bracket (34). As illustrated in FIGS. 4A and 4B, the bracket (34) is part of a slide assembly (33), further details which will be described later.

Between the slide assembly (33) and rear cover (42) is a scissor mechanism (38) sandwiched between an upper friction plate (36) and a lower friction plate (40). The scissors mechanism (38) according to one embodiment of the present invention is illustrated in an exploded view in FIG. 7, to be described later.

Referring still to FIG. 3, it is preferred that one or more of the components of the vertical lift mechanism (20) are symmetrical. This is advantageous as it reduces the complexity of the manufacture of the individual parts and avoids errors during assembly. For example, as viewed in FIG. 3, the slide assembly (33), upper friction plate (36), and lower friction plate (40) may be rotated 180° horizontally and still be installed properly.

An exemplary method of assembling the vertical lift mechanism (20) may include first placing the lower friction plate (40) onto the rear cover (42). In order to properly align the lower friction plate (40), the rear cover (42) may include one or more raised portions (80) which mate with a corresponding hole (81) in the lower friction plate (40).

Figure 12A:
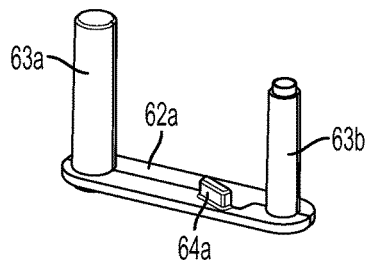
FIGS. 12A and 12B are perspective views of a lower end link of the scissors mechanism shown in FIGS. 10A through 10E.
Figure 12B:
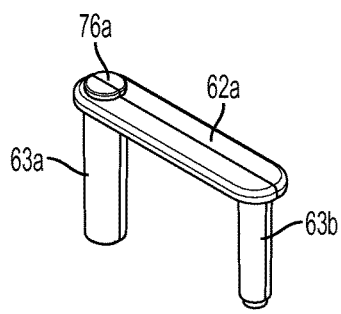
Figure 14A:
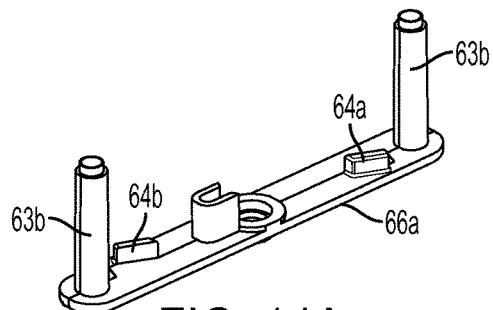
FIGS. 14A and 14B are perspective views of a lower scissors link of the scissors mechanism shown in FIGS. 10A through 10E.
Figure 14B:
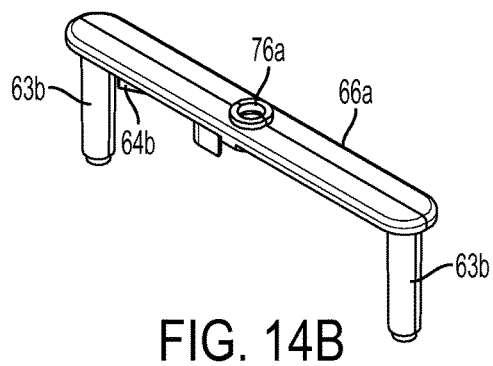

The scissors mechanism (38) may then be placed on the lower friction plate (40). The lower friction plate (40) may include an elongate slot which serves as a track for a series of lugs on a bottom surface of links of the scissors mechanism (38), such as the lugs (76a) on the bottom surface of the links of the scissors mechanism (38) illustrated in FIGS. 12B and 14B. For example, one of the lugs (76a) located underneath a proximal end post (63a) of a lower end link (62a) at the proximal end of the scissors mechanism (38) is inserted coaxially through an opening in the lower friction plate (40) and the rear cover (42).

Figure 13A:
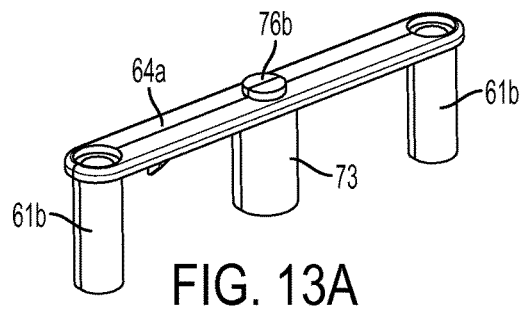
FIGS. 13A and 13B are perspective views of an upper scissors link of the scissors mechanism shown in FIGS. 10A through 10E.
Figure 13B:
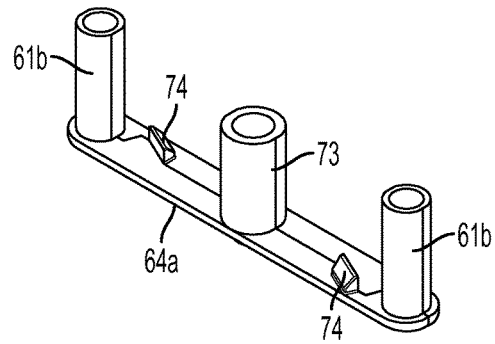

The upper friction plate (36) is placed on top of the scissors mechanism (38) and similarly includes a slot for lugs on an upper surface of links of the scissors mechanism (38), such as the lugs (76b) on the upper surface of the links of the scissors mechanism (38) illustrated in FIG. 13A. The upper friction plate also includes a hole at the proximal end to receive the tip of the proximal end post (63a) which extends above the upper end link (60a). The tip of a distal end post (63c) at the distal end of the scissors mechanism (38) is inserted in the slot of the upper friction plate (36).

The scissors mechanism (38) is pressed between the upper and lower friction plates (36, 40), which provide frictional surfaces for the outer surfaces of the links to ride along during operation of the vertical lift mechanism (20). The frictional force against the plates, like the friction elements (68) described later, may contribute to braking the scissors mechanism (38) at various positions.

Figure 6A:
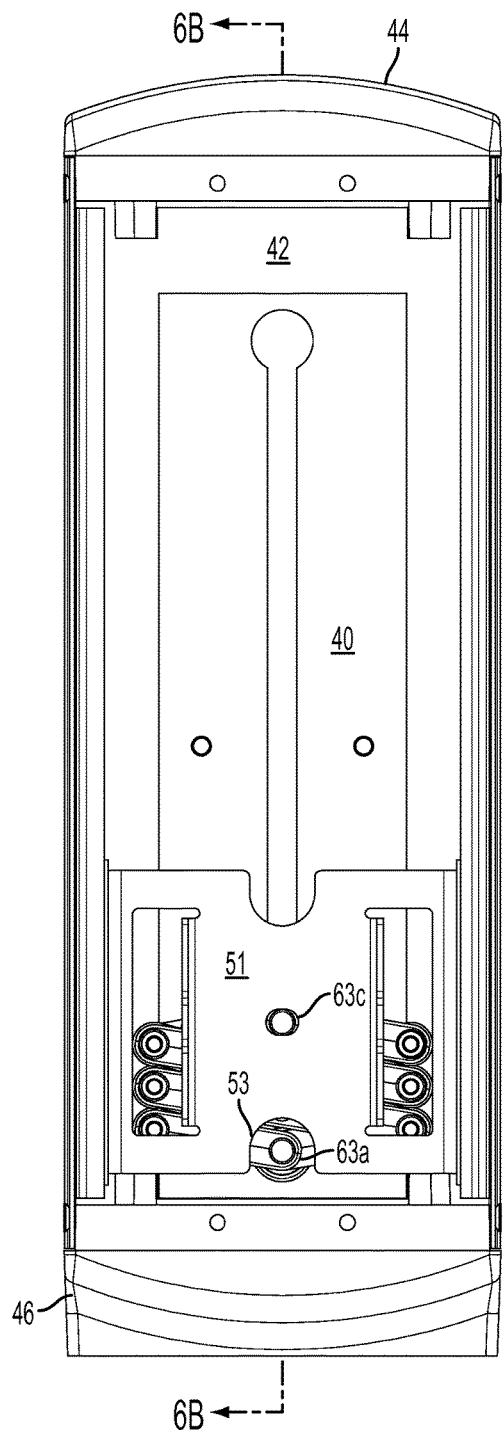
FIG. 6A is a front view of the device of FIGS. 2A and 2B with the front cover removed to reveal the interior of the device.
Figure 6B:
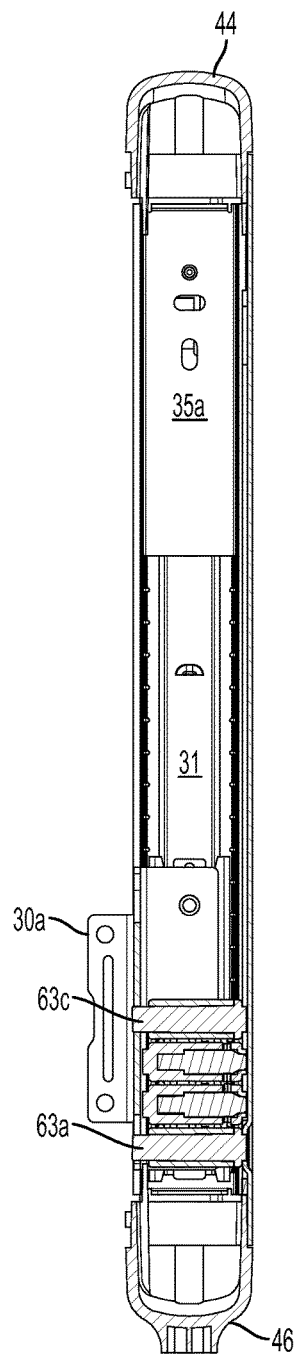
FIG. 6B is a cross-sectional side view of the device of FIGS. 2A and 2B, with the scissors mechanism of the device in a collapsed condition.

It is preferable that the width of the rails (35a, 35b) of the slide assembly (33) is greater than the width of the upper and lower friction plates (36, 40), such that the slide assembly (33) may be placed on the rear cover (42). The distal end post (63c) at the distal end of the scissors mechanism (38) may then be inserted into a central bore (52) of the slide plate (51), and the rails (35a, 35b) may be attached to the inner side walk of the rear cover (42), preferably by riveting. If it is likely that the slide plate will interfere with the proximal end post (63a) at the proximal end of the vertical lift mechanism, a notch (53) may be cut out of the slide plate to avoid contact between the two parts in the collapsed condition, as seen in FIG. 6A.

To complete the housing, the end cap (44) and base cap (46) may be placed into the appropriate position on either end of the rear cover (42). The front cover (32) may then be placed over the slide assembly (33) ensuring that the arms of the bracket extend through the elongate openings in the front cover (32). The front cover (32) may also include a hole at its proximal end to coaxially align with the proximal end post (63a) at the proximal end of the scissors mechanism (38). When the front cover (32) is in position, the housing may then be retained by using fasteners, such as threaded studs or screws in the form of the first set of fasteners (50a, 50b, 50c, 50d), at each corner of the housing.

As illustrated in FIGS. 4A and 4B, the bracket (34) is part of a slide assembly (33), which may further comprise two rails (35a, 35b) and a sliding mechanism for sliding the bracket (34) along the rails (35a, 35b). The sliding mechanism is preferably any mechanism that provides low friction contact as the bracket (34) moves along the rails (35a, 35b), for example, a ball slide.

The slide assembly (33) is preferably attached to the housing. More preferably, each rail (35a, 35b) is attached to an adjacent inner side wall of at least one of the front cover (32) or rear cover (42). Most preferably, the rails (35a, 35b) are attached to the inner side walls of the rear cover (42). The rails (35a, 35b) may be attached using a second set of fasteners (48a, 48b, 48c, and 48d), such as pop rivets shown in FIG. 3.

Figure 7:
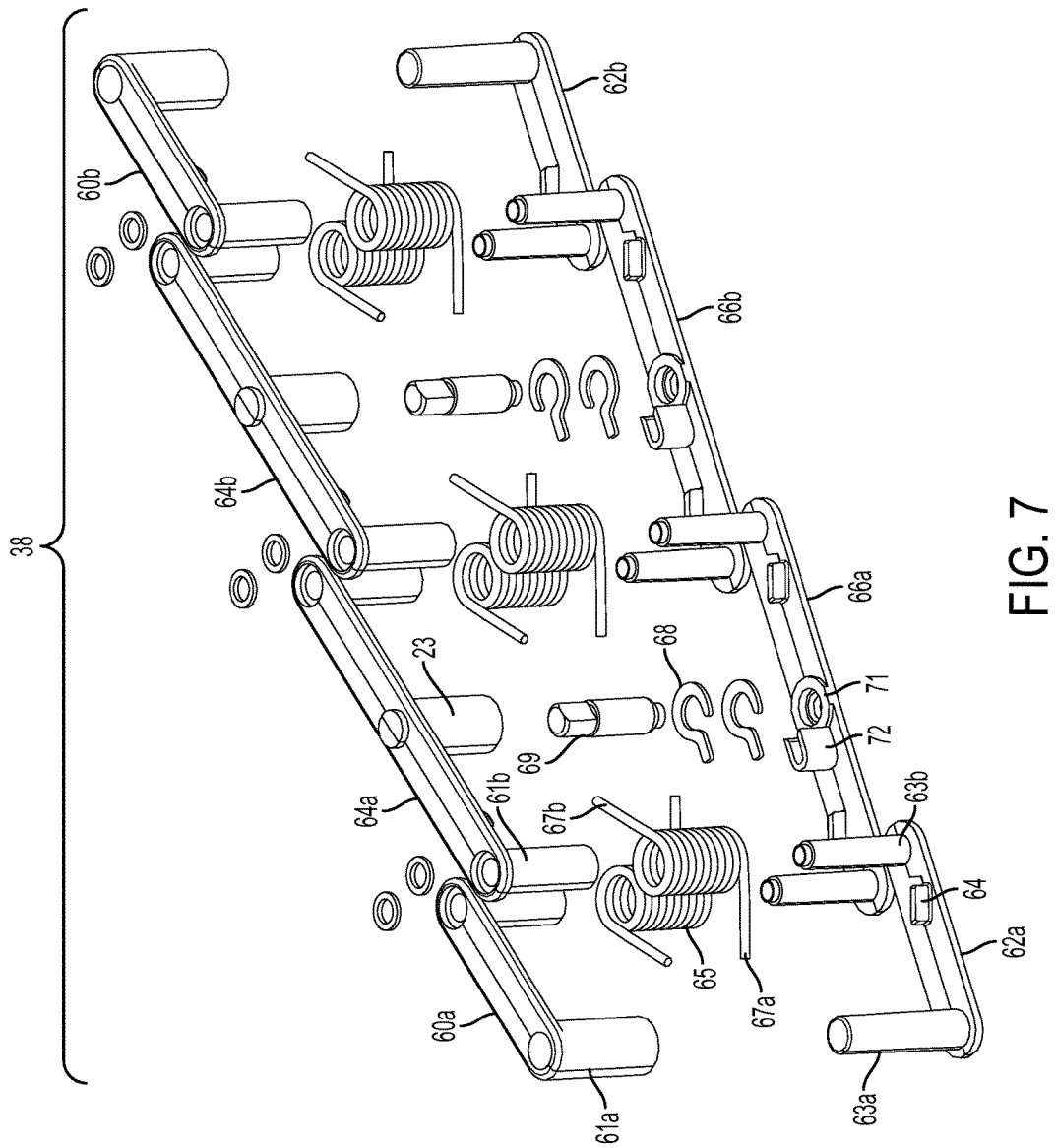
FIG. 7 is an exploded perspective view of an embodiment of the scissors mechanism of the device of FIGS. 2A and 2B.
Figure 9A:
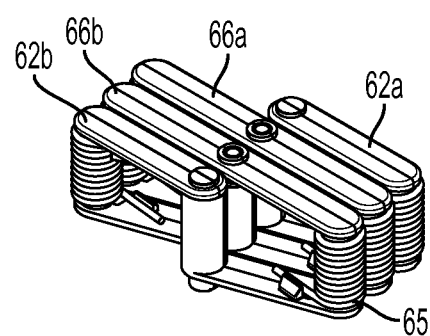
FIGS. 9A through 9F illustrate the scissors mechanism of FIG. 7 in a collapsed condition. Specifically.

Referring to FIG. 7, a scissors mechanism (38) according to one embodiment of the present invention is illustrated in an exploded view. The scissors mechanism (38) comprises upper end links (60a, 60b), lower end links (62a, 62b), one or more upper scissor links (64a, 64b), and one or more lower scissor links (66a, 66b). Together, these links form pairs of links that are coupled for rotation with respect to one another. For example, links 60a and 62a form a pair as do links 64a and 66a, links 64b and 66b, and links 60b and 62b.

The overall length of the scissors mechanism (38) is dictated by the number and length of the links in the scissors mechanism (38) and the number of pairs of those links. For example, the scissors mechanism (38) could include a single pair of links such as links 64b and 66b or links 60b and 62b. Although four pairs are provided in the embodiment illustrated in FIG. 7, fewer or more can be used depending on factors including the weight of the object(s) coupled to the linkage, the length of the path along which the object(s) are intended to be movable, and other design considerations.

An exemplary method of assembling the first embodiment of the scissors mechanism (38) illustrated in FIG. 7 may include first attaching one or more friction elements (68), which may include or be referred to as torque elements, onto a generally cylinder-shaped shaft (69). The friction elements (68) are preferably sickle-shaped (as will be described later with reference to FIG. 17), and the curved portion of the friction element (68) has an inner diameter which is equal to or preferably less than the outer diameter of the shaft (69), thereby providing frictional engagement between the two parts. The friction elements (68) are aligned and located on an end of the shaft (69), such that when an end of the shaft (69) is inserted into a central recess (71) in the lower scissor link (66a, 66b), tail portions of the friction elements (68) reside within a U-shaped tab (72). The U-shaped tab (72) maintains the orientation of the friction elements (68), so that the friction elements (68) do not rotate with the shaft (69) during operation of the scissors mechanism (38).

Referring to FIGS. 11A to 14b, the opposing ends of the lower scissor links (66a, 66b) and one end of the lower end links (62a, 62b) have generally cylindrical spring post such as spring post (63b), which extend through a torsion spring (65) when assembled. The lower end link (62a, 62b) also includes a proximal end post (63a) on an end opposite the spring post (63b). The lower scissor links (66a, 66b) and lower end links (62a, 62b) may include one or more tabs (64a, 64b) for providing a bearing surface for a lower spring leg (67a) of the torsion springs (65).

Referring again to FIG. 7, after loading torsion springs (65) over each spring post (63b), such that the lower spring leg (67a) rests against a tab (64), the upper end links (60a, 60b) and upper scissor links (64a, 64b) are placed onto the lower end links (62a, 62b) and lower scissor links (66a,b).

The opposing ends of the upper scissor links (64a, 64b), and one end of the upper end links (60a, 60b) each has a cylindrical spring tube (61b), wherein the external diameter of each spring tube (61b) is less than the inner diameter of the torsion spring (65), and the inner diameter of each spring tube (61b) is larger than the external diameter of the spring post (63b). The upper end links (60a, 60b) include a cylindrical end tube (61a) on the opposite end from the spring tube (61b), which mates with one of the proximal or distal end posts (63a, 63c) of the lower end links (62a, 62b).

Figure 16:
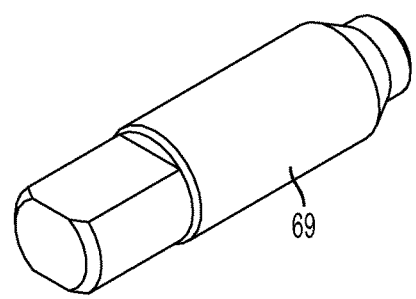
FIG. 16 is a perspective view of an embodiment of a shaft that can be used in the scissors mechanism illustrated in FIG. 7.

Each of the upper scissor links (64) further comprises a cylindrical central tube (73) which receives the shaft (69) to form a pair of scissor links, for example links (64a) and (66a), that share a center rotational axis defined by the shaft (69). During operation, the upper scissor links (64a, 64b) rotate with a shaft (69) in the opposite rotational direction than the lower scissor links (66a, 66b). The shaft (69) preferably includes a feature (such as a flat bearing surface as illustrated in FIG. 16), and the inner bore of the central tube (73) generally matches the shape of the shaft (69), so that the upper scissor links (64a, 64b) and shaft (69) rotate together.

When assembled, the spring tubes (61b) of each upper scissor link (64a, 64b) are loaded onto the spring posts (63b) of the lower links that are adjacent to the lower scissor link (66a, 66b), which share a center rotational axis with the upper scissor link (64a, 64b). As explained above, the proximal and distal end posts (63a, 63c) of the lower end links (62a, 62b) will mate with the end tube (61a) of an upper end link (60a, 60b). Furthermore, the spring tubes (61b) of the upper and links (60a, 60b) should be loaded onto the spring posts (63b) of the lower scissor link (66a, 66b) that is adjacent to the lower end link (62a, 62b), which mates with the upper end link (60a, 60b).

The scissors mechanism (38) preferably includes a means to retain the components together. In the embodiment illustrated in FIG. 7, each spring tube (61b) includes two open ends, so that an end of each spring post (63b) is exposed once inserted through the spring tube (61b). A washer (70) may be used to fill an annular space around the exposed end of the spring post (63b), and the exposed end may be peened, for example, to retain the links of the scissors mechanism (38) together while simultaneously allowing the links to rotate freely. The washer (70) would provide a positive stop against the peened material at the tip of the spring post (63b). The final assembly step includes rotating the upper spring legs (67b) of each torsion spring (65) over a wedge (74) located on the upper end links (60a, 60b) and upper scissor links (64a, 64b). The wedges (74) provide a second bearing surface for the torsion spring (65).

Figure 10A:
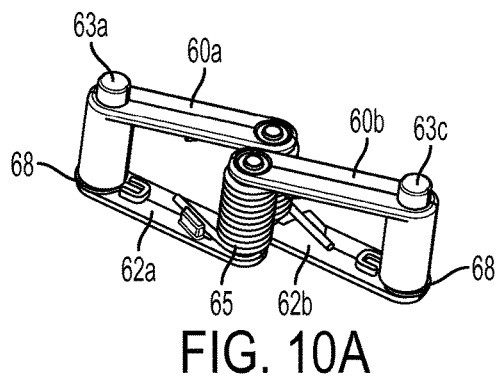
FIGS. 10A through 10E are perspective, top, side, bottom, and front views of another embodiment of the scissors mechanism.
Figure 10B:
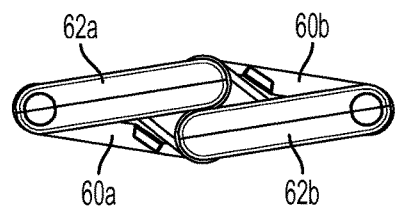
Figure 10C:
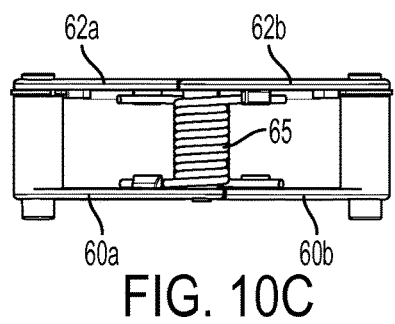
Figure 10D:
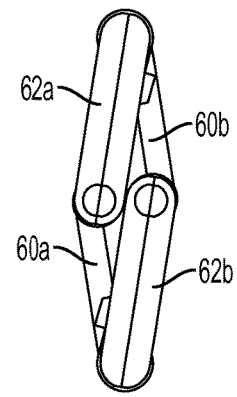
Figure 10E:
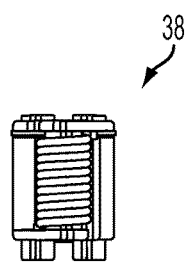
Figure 11A:
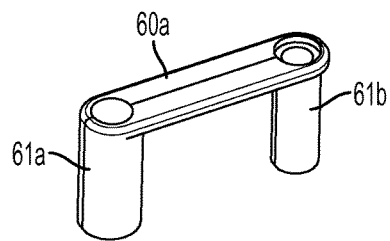
FIGS. 11A and 11B are perspective views of an upper end link of the scissors mechanism shown in FIGS. 10A through 10E.
Figure 11B:
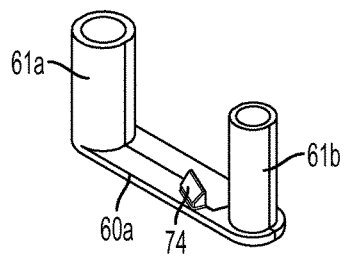

The elements of the scissors mechanism, the links, springs, and friction elements, may be arranged in various configurations depending on the desired range of motion and the force needed to counterbalance the weight of the first object. For example, an alternative embodiment of the scissors mechanism is illustrated in FIGS. 10A to 10E. To accommodate a short range of motion and/or a light first object, the scissors mechanism may comprise solely of a single pair of upper end links (60a, 60b) and lower end links (62a, 62b), i.e., without any scissor links. The upper and lower end links would be arranged in a generally rhombus-shape, as illustrated in FIGS. 10B and 10D. In this alternative embodiment, the friction elements (68) have been affixed to the end posts (63a, 63c), best seen in FIG. 10A.

In another embodiment (not illustrated), the scissors mechanism may include a pair of scissor links such as links 64b and 66b, without any end links. In this embodiment, the scissor links would form a generally X-shape. Because an X-shaped scissor mechanism would not provide a single proximal and distal end to which brackets can be coupled, an arcuate shaped cam opening can be provided in a bracket component in order to capture and guide the movement of the link ends toward or away from the path as the links are rotated with respect to one another.

Figure 8A:
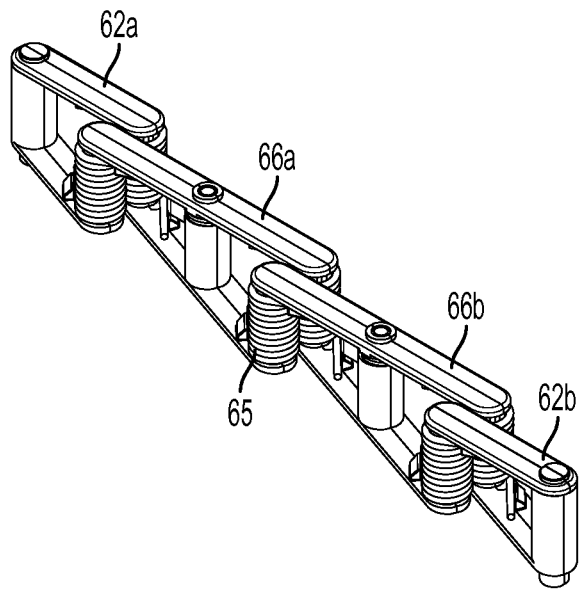
FIGS. 8A through 8F illustrate the scissors mechanism of FIG. 7 in an extended condition. Specifically.
Figure 8B:
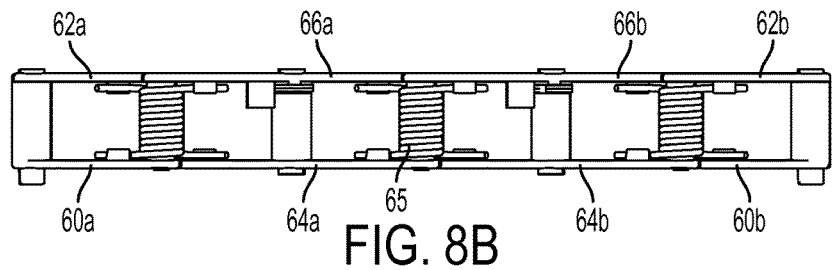
Figure 8C:
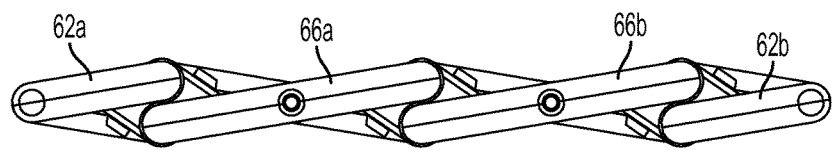
Figure 8D:
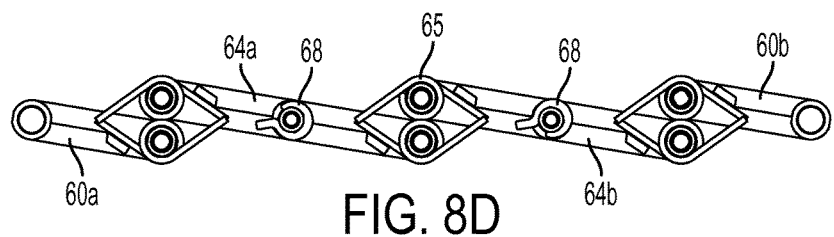
Figure 8E:
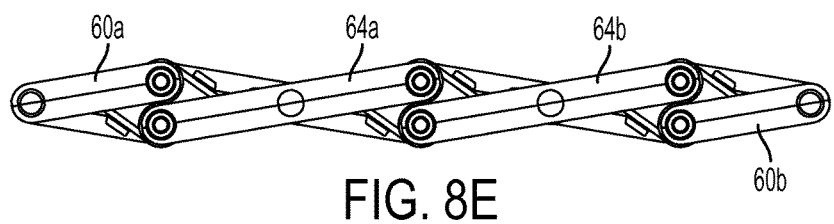
Figure 8F:
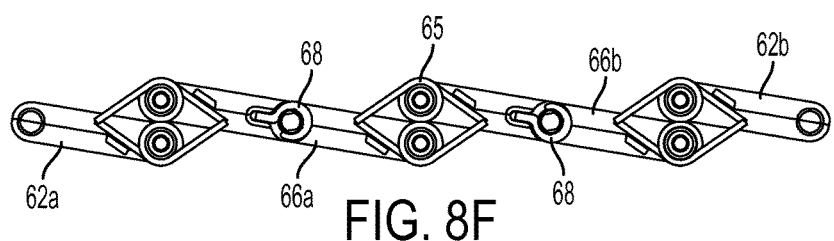

Once assembled, the torsion springs (65) will bias the scissors mechanism (38) to the extended position, as viewed in FIGS. 5A, 5B, and 8A-8F. Specifically, according to embodiments of the invention, the scissors mechanism is biased towards an extended orientation by the torsion springs, as viewed for example in FIG. 8C. This is a result of the spring legs of the torsion springs applying a force against the tab and wedge on the lower and upper links, respectively, as viewed for example in FIGS. 8D and 8F. FIGS. 8C and 8D are both a bottom view of the scissors mechanism (38), except that in FIG. 8D, the lower end links (62a, 62b) and lower scissor links (66a, 66b) have been removed to expose the torsion springs (65) and friction elements (68). Similarly, FIGS. 8E and 8F are both a top view of the scissors mechanism (38), except that in FIG. 8F, the upper end links (60a, 60b) and upper scissor links (64a, 64b) are removed.

In FIGS. 7 to 14B, the upper and lower surfaces of the links are illustrated with dividing lines spanning the length of the links. These lines are not intended to suggest that a parting line is necessarily present, which may occur if the parts are injection molded according to one possible manufacturing technique. The lines are merely intended to assist in identifying and/or visualizing the faces and optional surface definition of the various parts.

Figure 9B:
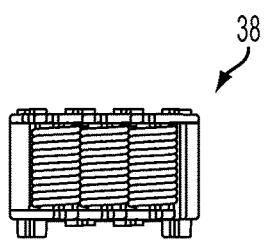
Figure 9C:
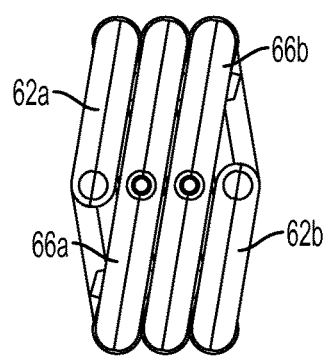
Figure 9D:
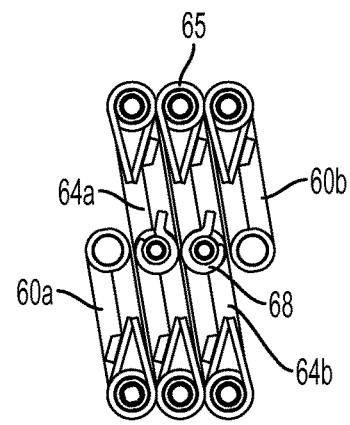
Figure 9E:
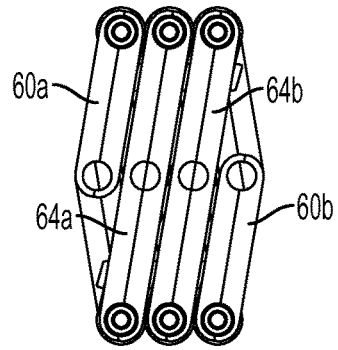

The central axes of the torsion springs are displaced horizontally as the scissors mechanism actuates between the extended and collapsed conditions. For example, FIGS. 8D and 9D provide bottom views of the scissors mechanism (38) in the extended and collapsed condition, respectively. In both views, the lower end links (62a, 62b) and lower scissor links (66a, 66b) have been removed. In FIG. 9D, the legs of the torsion springs are forced together causing the torsion springs to strain. The central axes of the torsion springs form outer pivot axes that are displaced away from the horizontal center line of the scissors mechanism (38) as viewed in FIGS. 8D and 9D. This is in contrast to the rotational axes of the scissor links and the end posts, which have little to no horizontal displacement.

Figure 9F:
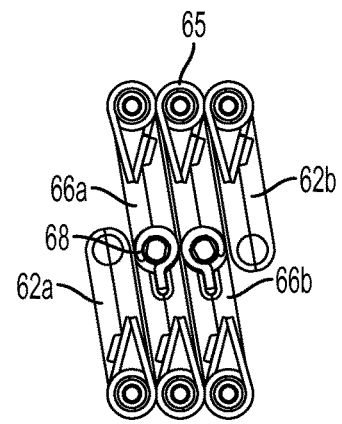

In the extended orientation, the resultant force generated by the torsion springs is applied in a nearly horizontal direction against the bearing surfaces of the tabs and wedges, as illustrated in FIGS. 8D and 8F. As the scissors mechanism retracts to the collapsed condition, as illustrated in FIGS. 9A to 9F, the torsion springs are wound and the strain in the torsion springs increases. Therefore, the resultant force output by the springs increases as the first object is moved down the vertical path. As the wedges and tabs rotate approximately ninety degrees from the extended condition to the collapsed condition, as illustrated in FIGS. 9D and 9F, the direction of the spring resultant force changes from nearly horizontal to nearly vertical, i.e., in the collapsed condition the force vector of the springs is essentially in the opposite direction of the force of gravity, assuming the vertical lift mechanism is in a plumb orientation.

As mentioned above, the torsion springs can be replaced with extension springs connected between the outer pivot axes of the scissors mechanism. As the scissors mechanism collapses, the extension springs stretch and increase the strain of the spring. Lifting a first object to the extended condition would relax the spring decreasing the force generated by the spring.

Figure 15:
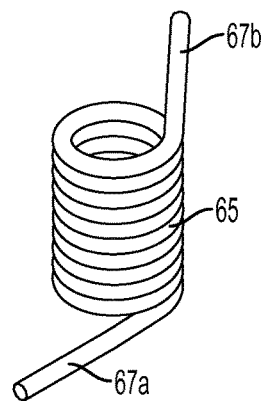
FIG. 15 is a perspective view of an embodiment of a spring that can be used in the scissors mechanism illustrated in FIG. 7.
Figure 17:
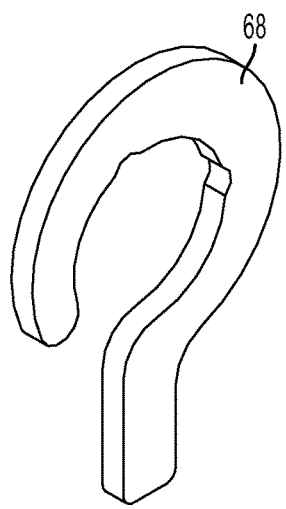
FIG. 17 is a perspective view of an embodiment of a friction element that can be used in the scissors mechanism illustrated in FIG. 7.

Detailed views of the spring, shaft and friction elements are shown in FIGS. 15-17, respectively. As mentioned previously, the friction elements (68) are preferably sickle-shaped (as in FIG. 17) and the curved portion of the friction element (68) has an inner diameter which is equal to or preferably less than the outer diameter of the shaft (69) thereby providing frictional engagement between the two parts. The number of friction elements (68) on a shaft (69) can be varied in order to control the friction generated within the linkage. In this way, the linkage can be configured for use with objects having various weight ranges. In other words, a particular friction generated by a particular number of friction elements (68) will be suitable for use in connection with objects within a weight range. Therefore, a single linkage design will accommodate a range of objects without adjustment by the user. By reducing or increasing the number of friction elements (68), the linkage is rendered suitable for use with heavier and lighter objects, respectively.

To illustrate, one linkage design can be configured for use with objects from A to C lbs in weight, another linkage design can be configured for use with objects from B to E lbs, and another linkage design can be configured for use with objects from D to F lbs. In this example, objects ranging from A to F lbs are accommodated by only three (3) linkage designs. Also, the ranges of weights need not be overlapping. For example, one linkage design can be configured for use with objects from A up to B lbs, another linkage design can be configured for use with objects from B up to C lbs, and another linkage design can be configured for use with objects from C to D lbs. Although three ranges are provided in these examples, however, it is contemplated that any number of ranges fewer or greater than three can be selected.

In one specific non-limiting example selected for illustration purposes, one linkage design "I" can be provided for use with objects from 6.4 up to 10.2 lbs, another linkage design "II" can be configured for use with objects from 10.2 up to 14.0 lbs, and another linkage design "III" can be configured for use with objects from 14.0 to 17.8 lbs. In this specific example, objects ranging from 6.4 to 17.8 lbs are accommodated by the three (3) linkage designs I-III. One of the linkage designs I-III can then be selected for use depending on the weight of the movable object with which it will be used. If a monitor having a weight of 13.5 lbs is intended to be mounted using the linkage, for example, then the linkage design II would be selected.

It will be understood from the foregoing description that the friction elements located on the central axes of the scissor links apply a frictional force to the surface of the shafts. The number of friction elements and the frictional fit between the two elements is selected to prevent the first object from inadvertently drifting up or down the vertical path without action by the user. Therefore, the friction elements act as resistance to ensure that a counterbalancing force is achieved. The friction elements essentially act as a brake to maintain the first object at the user selected height.

The overall length of the scissors mechanism is dictated by the number and length of the links in the scissors mechanism as noted previously. Therefore, the range of motion for the first object may be easily accommodated by slight variations to the scissors mechanism. The vertical lift mechanism may also be used to provide a counterbalancing force over a range of weights of the first object as noted above. This is achieved by simply selecting the appropriate number and rating for the torsion springs and friction elements.

A device according to this invention may have improved performance in terms of operation, reliability, durability, and cost effectiveness. It may also save space by having a smaller footprint.

For example, a device according to this invention may have improved performance in terms of cycle life. For example, a device according to embodiments of this invention may have a life approaching or even exceeding 20,000 cycles of use before failure.

Also, a device according to embodiments of this invention can eliminate the need for adjustment in order to accommodate use with different weights of objects. Accordingly, devices according to embodiments of this invention can be manufactured for use with objects having various ranges of weights. For example, in one embodiment, a version of the device can be manufactured for use with objects having a first weight range, and a second version of the device can be manufactured for use with objects within a second weight range, etc.

Additionally, devices according to embodiments of this invention can eliminate the need for levers or brakes in order to retain an object in a selected position after the user releases the object. When the device is used without such a lever or brake, the user can simply let go of the object and it will remain in the user-selected position. The preferred elimination of levers and brakes is advantageous in terms of cost reduction, improved user experience, and a "failsafe" condition if the user inadvertently lets go of the object.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A device for positioning an object at a user-adjusted position along a path with respect to another object, the device comprising:
   a linkage having an extended condition in which the object can be positioned distally away from the other object and a collapsed condition in which the object can be positioned proximally toward the other object, a distal end of the linkage being configured to be coupled to the object and a proximal end of the linkage being configured to be coupled to the other object;
   a friction element coupled to the linkage and configured to generate friction that resists movement of the linkage from the extended condition to the collapsed condition; and
   a spring coupled to the linkage and configured to bias the linkage toward the extended condition, the linkage including at least two pairs of links, each link being coupled to an adjacent link for rotation about a rotation axis.

2. The device of claim 1, wherein the distal end of the linkage is moveable along the path and the proximal end of the linkage is stationary or moveable.

3. The device of claim 2, wherein the distal end of the linkage is configured to be coupled to a monitor and the proximal end of the linkage is configured to be coupled to a desk top or cart top.

4. The device of claim 1, wherein a ratio of the force required to move the object to the weight of the object is less than one.

5. The device of claim 1, the linkage including a shaft connecting a link of one pair of links to link of an adjacent pair of links.

6. The device of claim 1, wherein the spring is a torsion spring oriented along the rotation axis.

7. The device of claim 6, the torsion spring being oriented such that the resultant force generated by the torsion spring is not parallel to the direction of the path when the linkage is in the extended condition.

8. The device of claim 1, wherein at least one of the friction element, spring, and linkage is selected such that the device is configured to resist unintended movement of the object over a range of weights.

9. The device of claim 1, wherein the path is oriented vertically.

10. The device of claim 9, wherein the friction generated by the friction element is sufficient to prevent movement of the linkage from the extended position to the collapsed position when the bias of the linkage toward the extended condition generated by the spring is less than the weight of the object.

11. The device of claim 9, wherein the friction generated by the friction element is sufficient to prevent movement of the device from the collapsed position to the extended position when the bias of the linkage toward the extended condition generated by the spring is greater than the weight of the object.

12. The device of claim 1, wherein the friction element is configured to brake movement of the object along the path such that a separate brake need not be included in the device.

13. The device of claim 1, the spring being oriented such that the resultant force generated by the spring is parallel to the direction of the path when the linkage is in the collapsed condition.

14. The device of claim 1, wherein a ratio of the force required to move the object to the weight of the object is substantially constant along the path.

15. The device of claim 1, wherein the friction elements are configured to maintain the object in the user selected position for objects within a predetermined range of weights.

16. The device of claim 1 comprising a plurality of springs.

17. The device of claim 1, wherein the spring is configured to generate increased force as the linkage moves toward the collapsed condition and reduced force as the linkage moves toward the extended condition.

18. The device of claim 1, further comprising at least one friction plate along which the linkage moves between the extended condition and the collapsed condition.

19. The device of claim 18, the at least one friction plate defining a slot extending along the path and configured to limit movement of the rotation axis of the at least one pair of links away from the path.

20. The device of claim 1, further comprising a slide assembly including a bracket to which the object and the linkage is coupled and a ball slide to guide the bracket along the path.

21. The device of claim 1, further comprising a housing to enclose the linkage, the housing having a cover, a proximal cap at a proximal end of the cover, and a distal cap at a distal end of the cover.

22. The device of claim 1, the device being configured to resist unintended movement of the object from the user-adjusted position along the path and to facilitate intended movement of the object proximally toward or distally away from the other object.

23. A device for positioning an object at a user-adjusted position along a path with respect to another object, the device comprising:
   a linkage having an extended condition in which the object can be positioned distally away from the other object and a collapsed condition in which the object can be positioned proximally toward the other object, a distal end of the linkage being configured to be coupled to the object and a proximal end of the linkage being configured to be coupled to the other object;
   a friction element coupled to the linkage and configured to generate friction that resists movement of the linkage from the extended condition to the collapsed condition; and
   a spring coupled to the linkage and configured to bias the linkage toward the extended condition, the spring being oriented such that the resultant force generated by the spring is parallel to the direction of the path when the linkage is in the collapsed condition;
   wherein the direction of the resultant force generated by the spring varies as the linkage moves between the collapsed condition and the extended condition.

24. A device for positioning an object at a user-adjusted position along a path with respect to another object, the device comprising:
   a linkage having an extended condition in which the object can be positioned distally away from the other object and a collapsed condition in which the object can be positioned proximally toward the other object, a distal end of the linkage being configured to be coupled to the object and a proximal end of the linkage being configured to be coupled to the other object;
   a friction element coupled to the linkage and configured to generate friction that resists movement of the linkage from the extended condition to the collapsed condition; and
   a spring coupled to the linkage and configured to bias the linkage toward the extended condition;
   the linkage including at least one pair of links coupled to one another for rotation with respect to one another about a rotation axis that is positioned along the path.

25. The device of claim 24, the friction element being positioned at the rotation axis of the at least one pair of links of the linkage, the friction element generating friction that resists rotation of the links with respect to one another about the rotation axis.

26. The device of claim 24, the spring being positioned to apply bias to the links of the at least one pair of links of the linkage, the spring being oriented to bias the linkage toward the extended condition.

* * * * *